(12) United States Patent
Kim et al.

(10) Patent No.: US 8,053,026 B2
(45) Date of Patent: Nov. 8, 2011

(54) NANOCOMPOSITES, SYNTHESIS METHOD THEREOF AND CAPACITOR COMPRISING THE SAME

(75) Inventors: Jin Go Kim, Ulsan (KR); Sang Bok Ma, Seoul (KR); Kwang Heon Kim, Seoul (KR); Kwang Bum Kim, Goyang-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 151 days.

(21) Appl. No.: 12/020,503

(22) Filed: Jan. 25, 2008

(65) Prior Publication Data

US 2009/0042028 A1 Feb. 12, 2009

(30) Foreign Application Priority Data

Aug. 6, 2007 (KR) ........................ 10-2007-0078605

(51) Int. Cl.
*B05D 5/12* (2006.01)
(52) U.S. Cl. .............................. 427/79; 427/58; 427/113
(58) Field of Classification Search .................. 428/364; 427/113, 58, 79
See application file for complete search history.

(56) References Cited

U.S. PATENT DOCUMENTS

| 5,229,563 A * | 7/1993 | Isogai et al. ................... 219/735 |
| 5,409,683 A * | 4/1995 | Tillotson et al. .............. 423/338 |
| 2006/0014375 A1* | 1/2006 | Ford et al. ..................... 438/622 |

OTHER PUBLICATIONS

Dixit et al., "Homogeneous precipitation from solution by urea hydrolysis: a novel chemical route to the alpha-hydroxides of nickel and cobalt", J. Mater. Chem., 1996, 6 (8), p. 1429-1432.*

Wang, Y. et al., Electrochemical Capacitance Performance of Hybrid Supercapacitors Based on $Ni(OH)_2$/Carbon Nanotube Composites and Activated Carbon, Journal of The Electrochemical Society, vol. 153 (4) pp. A743-A748, 2006.
Lee, J. et al., Nickel Oxide/Carbon Nanotubes Nanocomposite for Electrochemical Capacitance, Science Direct, Synthetic Metals, vol. 150 pp. 153-157, 2005.
Nam, K. et al. Synthesis and Electrochemical Investigations of $Ni_{1-x}O$ Thin Films and $Ni_{1-x}O$ on Three-Dimensional Carbon Substrates for Electrochemical Capacitors, Journal of The Electrochemical Society, vol. 152 (11) pp. A2123-A2129, 2005.

* cited by examiner

*Primary Examiner* — Matthew Matzek
(74) *Attorney, Agent, or Firm* — Christie, Parker & Hale, LLP

(57) ABSTRACT

A method for the synthesis of nanocomposites is provided. The method comprises the steps of mixing carbon nanotubes with a urea solution to form urea/carbon nanotube composites (first step), mixing the urea/carbon nanotube composites with a solution of a metal oxide or hydroxide precursor to prepare a precursor solution (second step), and hydrolyzing the urea in the precursor solution to form a metal oxide or hydroxide coating on the carbon nanotubes (third step). Further provided are nanocomposites synthesized by the method. In the nanocomposites, a metal oxide or hydroxide is coated to a uniform thickness in the nanometer range on porous carbon nanotubes. Advantageously, the thickness of the coating can be easily regulated by controlling the urea content of urea/carbon nanotube composites as precursors. In addition, the nanocomposites are nanometer-sized powders and have high electrical conductivity and large specific surface area. Therefore, the nanocomposites are useful as electrode active materials for electrochemical capacitors, including pseudo capacitors and electrochemical double layer capacitors, lithium secondary batteries, and polymer batteries. Further provided is a capacitor comprising the nanocomposites.

13 Claims, 4 Drawing Sheets
(4 of 4 Drawing Sheet(s) Filed in Color)

(a)

(b)

(c)

(d)

NANOCOMPOSITES, SYNTHESIS METHOD THEREOF AND CAPACITOR COMPRISING THE SAME

CROSS-REFERENCE TO RELATED APPLICATIONS

This application claims priority to Korean Patent Application No. 10-2007-0078605 filed on Aug. 6, 2007.

BACKGROUND OF THE INVENTION

1. Field of the Invention

The present invention relates to nanocomposites, a method for synthesizing the nanocomposites, and an electrochemical capacitor comprising the nanocomposites. More specifically, the present invention relates to nanocomposites that have the advantages of easy process control, high electrical conductivity and large specific surface area, a method for synthesizing the nanocomposites, and an electrochemical capacitor comprising the nanocomposites.

2. Description of the Related Art

With the recent rapid development of portable electronic communication devices and hybrid vehicles, there has been an increasing demand for energy sources with high energy density and high power. In view of this demand, electrochemical capacitors have attracted attention as energy sources capable of replacing or supplementing conventional secondary batteries.

Electrochemical capacitors have lower energy density but retain much higher power density than existing secondary batteries. Therefore, electrochemical capacitors are advantageous in supplying high-power energy. In addition, electrochemical capacitors exhibit excellent performance characteristics in terms of charge/discharge time and cycle life over secondary batteries. Based on these advantages, electrochemical capacitors are suitable for use as pulse power sources of portable communication devices, energy sources for CMOS memory back-up, load-leveling systems for electric vehicles, and so forth. Recent research has also reported that the use of a hybrid energy source constructed by combining an existing secondary battery with an electrochemical capacitor contributed to a dramatic increase in the cycle life of the secondary battery.

Electrochemical capacitors can be largely classified into two different types: electrochemical double layer capacitors (EDLCs) and pseudo capacitors (or supercapacitors). An advantage of EDLCs is that high capacitance can be achieved by the use of an electrode active material having a large specific surface area. However, EDLCs are limited to low-current applications because of low actual storage capacity resulting from the presence of fine pores of activated charcoal as an electrode active material and incomplete wetting of electrolytes, and high internal resistance of the carbon system.

Pseudo capacitors use secondary oxidation/reduction reactions at the electrode/electrolyte interfaces and exhibit about 10-100 times higher capacitance than EDLCs. Electrode materials for pseudo capacitors include metal oxides, such as $RuO_2$, $IrO_2$, $NiO_x$, $CoO_x$ and $MnO_2$, and conductive polymers.

$RuO_2$ has extremely high energy and power densities but is highly priced, which limits its use to aerospace engineering and military fields. The low capacitance of the other electrode materials leaves great room for improvement.

Thus, there is a need to produce high-capacity metal oxide electrodes at low cost. Recently, nickel oxide has received considerable attention as an electrode material for next-generation batteries and capacitors due to its large specific surface area and high theoretical capacity.

Metal oxides in the form of micrometer-sized powders have typically been used as electrode active materials for pseudo capacitors. Most reactions occur in a depth of several nanometers from the surface of metal oxides to accumulate and generate electricity. Accordingly, the use of metal oxide in the form of a micrometer-sized powder does not contribute to the improvement of capacity because electrochemical effects are not substantially attained within the metal oxide particles. Under these circumstances, considerable research efforts have been made in developing nanometer-sized metal oxides with maximal electrochemical utilization.

To find applications as electrode materials, metal oxides are required to have high electrical conductivity and porosity, and to be processed on a nanometer scale. To meet these requirements, attempts have been made to develop metal oxide/carbon composite materials that are configured to provide continuous conductive paths and have a three-dimensional porous structure while maintaining high electrical conductivity to maximize the impregnation with electrolytes and the interfaces with electrode active materials.

Electrochemical and chemical methods have been known as representative methods to coat metal oxides (e.g., nickel oxide) as active materials on carbon materials (e.g., carbon nanotubes) on a nanometer scale.

According to a typical electrochemical method, a carbon nanotube thin film is grown on a platinum-coated silicon wafer by electrostatic spray deposition (ESD) to produce a substrate, and then the substrate is immersed in an aqueous solution of nickel nitrate, followed by galvanostatic pulse deposition to coat nickel hydroxide on the substrate (*Journal of the electrochemical society*, 152, 11A2123, 2005). Despite the advantages that relatively uniform coating is possible and the coating thickness can be regulated by controlling the electric energy, the method is not practically used on an industrial scale because the active material is in the form of a thin film rather than in the form of a powder.

According to a typical chemical method, carbon nanotubes are dispersed in an aqueous solution of nickel nitrate and then an aqueous solution of potassium hydroxide or ammonium hydroxide is added thereto to precipitate nickel hydroxide (*J. Electrochem. Soc.*, 153, A743, 2006; *Synthetic Metals*, 150, 153, 2005). However, the carbon nanotubes are simply added for the formation and growth reactions of homogeneous nickel hydroxide nuclei, causing problems in that uniform coating of the nickel hydroxide is difficult, the nickel hydroxide tends to aggregate and precipitate due to the formation of homogenous nuclei between the linear carbon nanotube strands, and the carbon nanotubes are embedded in an excess of the nickel hydroxide particles.

SUMMARY OF THE INVENTION

It is a first object of the present invention to provide a method for the synthesis of nanocomposites by which a metal oxide or hydroxide coating having a constant thickness in the nanometer range and a uniform shape can be formed on carbon nanotubes (CNTs).

It is a second object of the present invention to provide nanocomposites comprising a metal oxide or hydroxide coating whose thickness is constant and whose shape is uniform.

It is a third object of the present invention to provide an electrochemical capacitor (or a supercapacitor), such as an electrochemical double layer capacitor (EDLC) or a pseudo capacitor, with excellent electrical properties, such as high electrical conductivity, which comprises the nanocomposites.

According to the present invention, the first object can be accomplished by providing a method for the synthesis of nanocomposites, the method comprising the steps of mixing carbon nanotubes with a urea solution to form urea/carbon nanotube composites (first step), mixing the urea/carbon nanotube composites with a solution of a metal oxide or hydroxide precursor to prepare a precursor solution (second step), and hydrolyzing the urea in the precursor solution to form a metal oxide or hydroxide coating on the carbon nanotubes (third step).

According to the present invention, the second object can be accomplished by providing nanocomposites in the form of powders comprising carbon nanotubes and a metal oxide or hydroxide coating formed over the entire surface of the carbon nanotubes wherein the coating has a thickness of 10 nm or less.

According to the present invention, the third object can be accomplished by providing an electrochemical capacitor comprising the nanocomposites in the form of powders.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1, FIGS. 1a-1d, shows schematic diagrams illustrating a method for the synthesis of nickel hydroxide/carbon nanotubes according to an embodiment of the present invention;

FIG. 3, FIGS. 3a-3d, shows scanning electron mnicroscopy (SEM) images of surface shapes of urea/carbon nanotube composites formed in Example 1-(2);

FIG. 6, FIGS. 6a-6d, shows SEM images of nickel hydroxide/carbon nanotube composites synthesized in Example 1-(3)

DESCRIPTION OF THE PREFERRED EMBODIMENTS

The present invention provides a method for the synthesis of nanocomposites, comprising the steps of mixing carbon nanotubes with a urea solution to form urea/carbon nanotube composites (first step), mixing the urea/carbon nanotube composites with a solution of a metal oxide or hydroxide precursor to prepare a precursor solution (second step), and hydrolyzing the urea in the precursor solution to form a metal oxide or hydroxide coating on the carbon nanotubes (third step).

According to the method of the present invention, the hydrolysis of the urea formed on the carbon nanotubes in the precursor solution causes a pH change only in the vicinity of the carbon nanotubes. This local change in pH enables the synthesis of the nanocomposites in an easy manner and allows the metal oxide or hydroxide coating to have a constant thickness and be uniform in shape. In addition, the method of the present invention has an advantage in that the thickness of the coating can be readily regulated by controlling the content of urea to be hydrolyzed.

Figure 1:
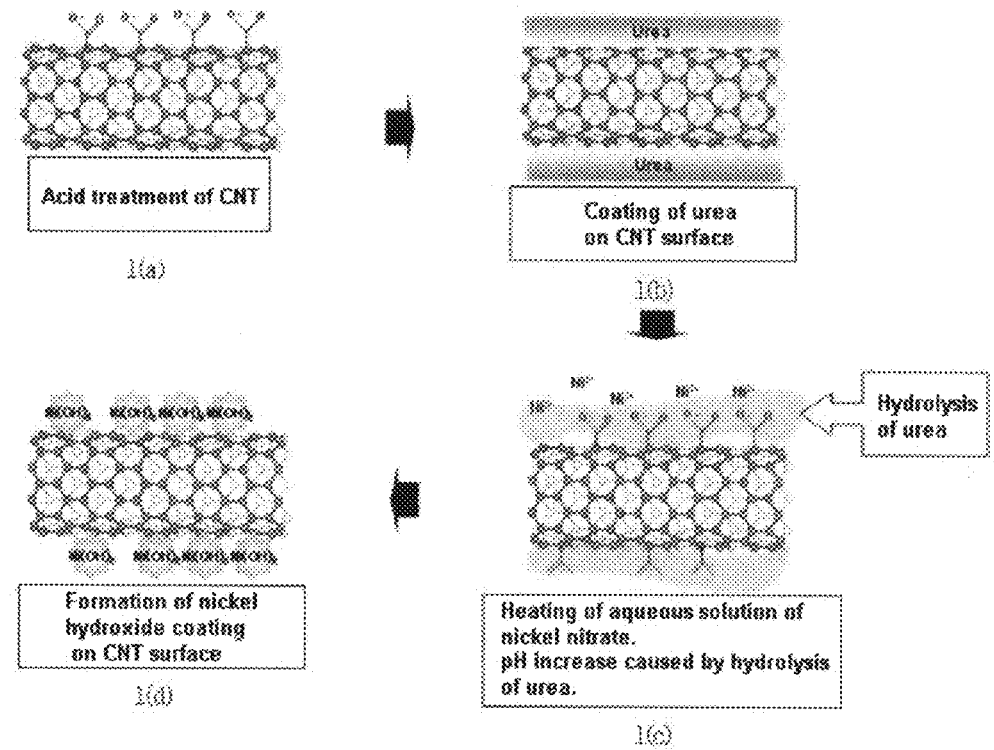
Figure 2:
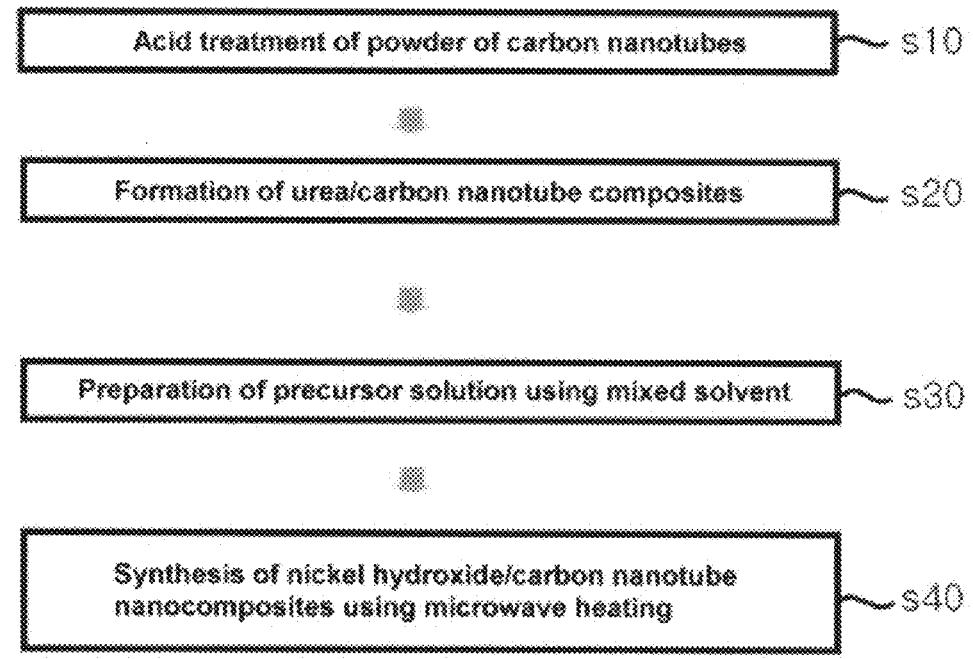
FIG. 2 is a flow chart of a method for the synthesis of nanocomposites according to an embodiment of the present invention.

The method of the present invention will now be explained in detail with reference to FIG. 1.

In the first step, carbon nanotubes are mixed with a urea solution to form urea/carbon nanotube composites. It is preferred to introduce hydrophilic functional groups on the carbon nanotubes before the mixing (1(a)). The reason is that hydrophilic functional groups are introduced to improve the dispersibility of the carbon nanotubes in the urea solution and the coating efficiency of the urea on the carbon nanotubes and to advantageously remove impurities, e.g., metal catalysts, which may be introduced during processing of the carbon nanotubes into powders.

Examples of such hydrophilic functional groups include, but are not limited to, carboxyl (—COOH and —COO$^-$), hydroxyl (—OH) and amino (—NH$_2$) groups. There is no particular limitation on the method for introducing the hydrophilic functional groups on the carbon nanotubes. For example, the carbon nanotubes can be treated with an acidic solution. In this case, it is preferred to dip the carbon nanotubes in the acidic solution to introduce hydrophilic functional groups on the carbon nanotubes. The acidic solution is preferably strongly acidic. The acidic solution preferably contains at least one acid selected from the group consisting of sulfuric acid, nitric acid and hydrochloric acid. As a result of the acid treatment, hydrophilic functional groups can be introduced on the surface of the carbon nanotubes. The acid treatment is advantageous in inducing a repulsive force between the functional groups to improve the dispersibility of the carbon nanotubes and makes the physical adsorption of urea to the carbon nanotubes easier.

The acid treatment conditions are not particularly restricted and may be appropriately varied depending on various factors such as the number of the functional groups to be introduced on the carbon nanotubes. For example, the acid treatment can be carried out by adding an appropriate amount of carbon nanotubes to a strongly acidic solution at a pH of 0.5 or less and preferably substantially zero and heating the mixture to a constant temperature of 60 to 90° C. for 2 to 6 hours. The acid-treated carbon nanotubes can be separated by any process known in the art. For example, after the resulting acidic solution is passed through a suitable filter to collect the acid-treated carbon nanotubes, an appropriate solvent, e.g., distilled water is used to wash the acid-treated carbon nanotubes, followed by heating to remove the solvent. When the carbon nanotubes partially aggregate during the acid treatment, the drying serves to effectively divide the aggregates into powders.

In the first step, carbon nanotubes, which may have hydrophilic functional groups introduced thereon by acid treatment, are mixed with urea. Any process may be employed without any particular limitation to mix the carbon nanotubes with urea. For example, carbon nanotubes are stirred in a urea solution to obtain a homogeneous mixture. The carbon nanotubes mixed with the urea solution may have any shape and are preferably in the form of powders. The mixing enables uniform coating of the urea on the carbon nanotubes through physical adsorption to form urea/carbon nanotube composites (1(b)). There is no particular limitation on the mixing conditions. For example, the carbon nanotubes are stirred with the urea solution at room temperature for 4 to 6 hours. These mixing conditions are merely illustrative and may be optionally set according to the amount of the carbon nanotubes, the concentration of the urea solution and/or the desired content of the urea in the composites.

The urea solution can be prepared by dissolving urea in a suitable solvent, such as water or ammonia water. The thickness and the weight of the urea adsorbed on the carbon nanotubes of the composites are determined linearly by the concentration of the urea solution. The thickness of a metal oxide or hydroxide coating to be formed on the carbon nanotubes is determined according to the weight ratio of the urea to the carbon nanotubes in the urea/carbon nanotube composites. Consequently, the thickness of a final metal oxide or hydroxide coating can be easily regulated by controlling the concentration of the urea solution used in the first step.

The content of the urea in the urea/carbon nanotube composites formed in the first step is preferably between 20 and 75 parts by weight. If the urea content is below 20 parts by weight, the hydrolysis of the urea in the final precipitation of nickel hydroxide is insufficient. Meanwhile, if the urea content is above 75 parts by weight, the urea solution is supersaturated, and as a result, the amount of the urea coated on the CNTs is saturated. Since the urea solution has a saturation concentration of 8M, the amount of the urea coated on the CNTs is substantially maintained at a constant level above 8M. However, the urea content of the composites formed in the first step is dependent on the desired thickness of a metal oxide or hydroxide coating to be formed and is not particularly limited. For example, when it is intended to adjust the thickness of a metal oxide or hydroxide coating to be formed on the carbon nanotubes to 5 to 6 mm, it is preferred that the urea solution used in the first step have a concentration of 5 to 7 M (molar concentration) and the urea content of the urea/carbon nanotube composites be about 64% by weight.

The urea/carbon nanotube composites formed in the first step are separated by any process known in the art prior to the second step. For example, the solution is passed through a suitable filter to collect the composites only. It is preferred to dry and/or powder the urea/carbon nanotube composites under suitable conditions before the second step. The drying is preferably done by heating the urea/carbon nanotube composites at 50 to 60° C. for 46 to 50 hours, but is not limited to these conditions.

In the second step, the urea/carbon nanotube composites are mixed with a solution of a metal oxide or hydroxide precursor to prepare a precursor solution. The mixing may be done by any technique, such as stirring.

The metal oxide or hydroxide precursor solution can be prepared by dissolving a metal oxide or hydroxide precursor in a solvent. Examples of suitable metal oxide and hydroxide precursors for use in the present invention include Ni, Cu, Cr, Co, Zn and Fe salts. Specifically, as the metal oxide or hydroxide precursor, there may be exemplified nickel nitrate, nickel acetate, nickel chloride, nickel carbonate, nickel sulfate, ferrous sulfate, cobalt sulfate, cobalt nitrate, cobalt chloride, zinc chloride, zinc sulfate, copper sulfate, cuprous chloride, or potassium dichromate. However, these precursors are provided for illustrative purposes only, and any metal salt may be used so long as a hydroxide or oxide can be formed in response to a change in the pH of the precursor solution.

Any solvent capable of dissolving the metal oxide or hydroxide precursor may be used. A mixed solvent of water and an organic solvent is preferable. When water is used singly as the solvent, there is a danger that the highly water-soluble urea may be dissolved and drained into the external solution (bulk solution) before subsequent hydrolysis, resulting in hydrolysis of the urea throughout the solution in the subsequent third step. This hydrolysis causes a pH change over the entire region of the solution rather than in the vicinity of the carbon nanotubes. In this case, nuclei are uniformly formed and grow within the solution and the metal oxide or hydroxide is precipitated not only on the surface of the carbon nanotubes but also throughout the solution.

There is no particular limitation on the kind of the organic solvent used in the present invention. An organic solvent that does not readily dissolve the urea and is highly miscible with water would be desirable. The organic solvent is homogeneously mixed with water to prepare a mixed solvent. The metal oxide or hydroxide precursor is completely dissolved in the mixed solvent to prepare a homogeneous solution as a whole. In addition, the mixed solvent is used as a source of water necessary for the hydrolysis of the urea. The presence of the organic solvent, in which the urea has a very low solubility, prevents the urea from being dissolved and precipitated before hydrolysis. Examples of such organic solvents include alcohols, such as methanol, ethanol, propanol and butanol. Propanol is more preferable in terms of the miscibility with water. The mixing ratio between the organic solvent and water is not particularly limited. For example, water and the organic solvent can be used in a volume ratio of 4:96 to 10:90 and preferably 4:96 to 7:93. If the proportion of water in the mixed solvent is smaller than 4% by volume, the urea would not be substantially hydrolyzed. If the proportion of water in the mixed solvent is larger than 10% by volume, there is a large possibility that the urea may be dissolved in the vicinity of the carbon nanotubes and drained into the bulk solution before hydrolysis, and as a result, it is difficult to coat nickel hydroxide on the carbon nanotubes.

The concentration of the metal oxide or hydroxide precursor in the mixed solution is appropriately determined depending on the desired thickness of a metal oxide or hydroxide coating to be formed. The thickness of the coating is not particularly limited. For example, the content of the metal oxide or hydroxide precursor in the solution is controlled such that the concentration reaches 0.05 to 1 M (molar concentration).

In the third step, the urea of the urea/carbon nanotube composites is hydrolyzed in the precursor solution. This hydrolysis causes a pH change only in the vicinity of the composites within the solution (1(c)). The urea may be hydrolyzed by any method, preferably, microwave heating. An advantage of the microwave heating method is that the solution can be uniformly heated. Another advantage of the microwave heating method is that microwave heating can markedly shorten the reaction time when compared to conductive heating, thus inhibiting the urea from being dissolved and drained into the solution and allowing the hydrolysis of the urea to more efficiently proceed. The hydrolysis is preferably conducted in a state in which the precursor solution is blocked from the outside at 110 to 150° C. and preferably 120 to 140° C. for 8 to 12 minutes, but is not limited to these conditions. At a hydrolysis temperature below 110° C., there is a possibility that the overall reaction may not be completed within the reaction time. Meanwhile, a hydrolysis temperature above 150° C. is uneconomical.

Microwave heating is performed to hydrolyze only the urea present on the surface of the carbon nanotubes, thus causing a local change in pH within the precursor solution. The hydrolysis occurs irrespective of the pH of the precursor solution. The hydrolysis of the urea proceeds through different reaction pathways depending on the pH of the solution, as depicted in Reaction Schemes 1 (at pH<7) and 2 (at pH>7).

Reaction Scheme 1

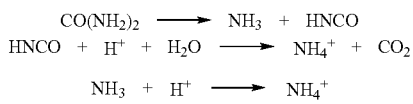

Reaction Scheme 2

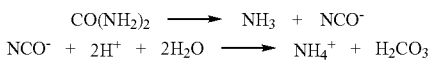

Protons ($H^+$) present in the precursor solution are consumed during the hydrolysis of the urea through the reactions depicted in Reaction Scheme 1 or 2, resulting in a change (increase) in pH. Since the urea is present only on the surface of the carbon nanotubes within the solution, the hydrolysis of the urea occurs only in the particular region. Accordingly, a pH change of the solution occurs locally only on the surface of the carbon nanotubes, and nuclei are heterogeneously formed and grow within the precursor solution. The pH on the surface of the carbon nanotubes is preferably adjusted to 8 to 10. No precipitation of nickel hydroxide takes place at a pH lower than 8. Meanwhile, there is a possibility that materials other than nickel hydroxide may be precipitated at a pH higher than 10. However, the pH range is illustrative only, and may be optionally determined depending on the kind of the metal oxide or hydroxide precursor and the desired thickness of the coating.

Nanocomposites synthesized through the steps are composed of the CNTs and the metal oxide or hydroxide uniformly formed on the CNTs (1(d)). The nanocomposites can be separated by general methods known in the art. For example, the nanocomposites can be separated by centrifuging the solution several times and washing the precipitate several times with an appropriate solvent (e.g., distilled water) to remove residual anions and metal ions. Thereafter, it is preferred to dry the nanocomposites at 80 to 120° C. for 22 to 26 hours. Drying of the nanocomposites at a temperature lower than 80° C. prolongs the drying time. Meanwhile, drying of the nanocomposites at a temperature higher than 120° C. may involve the possibility of phase change of the metal hydroxide to the corresponding metal oxide. The nanocomposites are preferably in the form of powders, but are not particularly limited to the shape.

The present invention also provides nanocomposites in the form of powders comprising carbon nanotubes and a metal oxide or hydroxide coating formed over the entire surface of the carbon nanotubes wherein the coating has a thickness of 10 nm or less.

In the nanocomposites of the present invention, the metal oxide or hydroxide coating is formed to a uniform thickness over the entire surface of the porous carbon nanotubes without partial aggregation on the surface of the carbon nanotubes. Further, the nanocomposites of the present invention are nanometer-sized powders and have high electrical conductivity and large specific surface area. Therefore, the nanocomposites of the present invention are useful as electrode materials for lithium secondary batteries, supercapacitors, including electrochemical double layer capacitors and pseudo capacitors, and polymer batteries. The metal oxide or hydroxide coating of the nanocomposites according to the present invention is preferably formed of at least one metal oxide or hydroxide selected from the group consisting of oxides and hydroxides of Ni, Cu, Cr, Co, Zn and Fe. The thickness of the metal oxide or hydroxide coating is preferably 10 nm or less and more preferably 3 to 6 nm. A portion of the coating thicker than 10 nm is not electrochemically available and is thus uneconomical. The method of the present invention is preferably used to synthesize the nanocomposites of the present invention. It is to be understood that various methods can be applied to the synthesis of the nanocomposites according to the present invention.

The present invention also provides an electrochemical capacitor comprising the nanocomposites in the form of powders as electrode active materials. The electrochemical capacitor may be of any type so long as the nanocomposites can be applied to the electrochemical capacitor. Examples of suitable electrochemical capacitors (supercapacitors) include electrochemical double layer capacitors and pseudo capacitors.

The nanocomposites as electrode active materials included in the capacitor of the present invention can provide paths through which electrons can travel efficiently due to their high electrical conductivity, and increase the areas for the impregnation with electrolytes and the reaction systems due to the porous structure of the carbon nanotubes, resulting in improvements in the capacity and power characteristics of the capacitor. Since the nanocomposites of the present invention are in the form of nanometer-sized powders, the diffusion distances of the reaction species within the solid are shortened and the areas for the reaction systems are increased, advantageously resulting in an improvement in the electrochemical utilization of the capacitor. The constituent material and the structure of the capacitor according to the present invention are not especially limited so long as the capacitor comprises the nanocomposites as electrode active materials. Any general material and structure known in the art can be applied to the capacitor of the present invention. In addition, the nanocomposites of the present invention can be used for the manufacture of lithium secondary batteries and polymer batteries.

Hereinafter, the present invention will be explained in more detail with reference to the following examples. However, these examples are not intended to limit the scope of the invention.

EXAMPLES

Example 1

Example 1-(1)

Treatment of Powder of Carbon Nanotubes with Acid 3 g of carbon nanotubes in the form of powders were added to 250 ml of an aqueous nitric acid solution (60%) and heated at 100° C. for 8 hours to treat the carbon nanotubes with the acid. Subsequently, the acidic solution was passed through a filter to collect the acid-treated carbon nanotubes. The acid-treated carbon nanotubes were washed several times with distilled water, dried, and powdered.

Example 1-(2)

Formation of Urea/carbon Nanotube Composites

First, 1 M, 2 M, 6 M and 8 M urea solutions were prepared. 1 g of the acid-treated carbon nanotubes were added to each of the urea solutions. The mixture was stirred at room temperature for about 5 hours to form urea/carbon nanotube composites. The urea/carbon nanotube composites were separated by filtration, washed several times with distilled water, dried at about 55° C. for 48 hours, and powdered.

Figure 3:
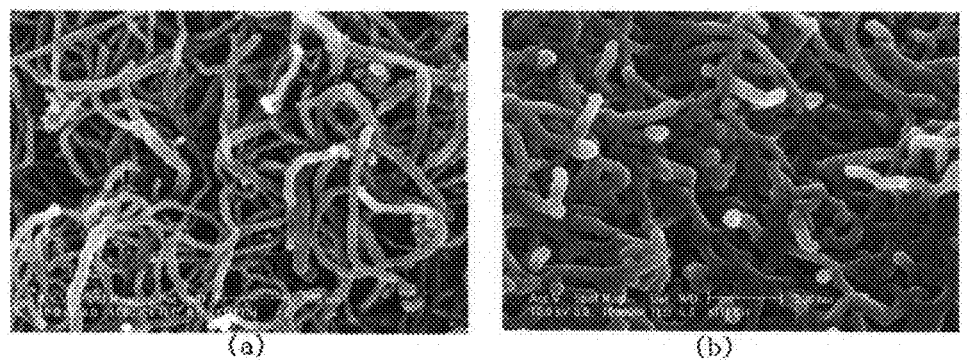
Figure 3:
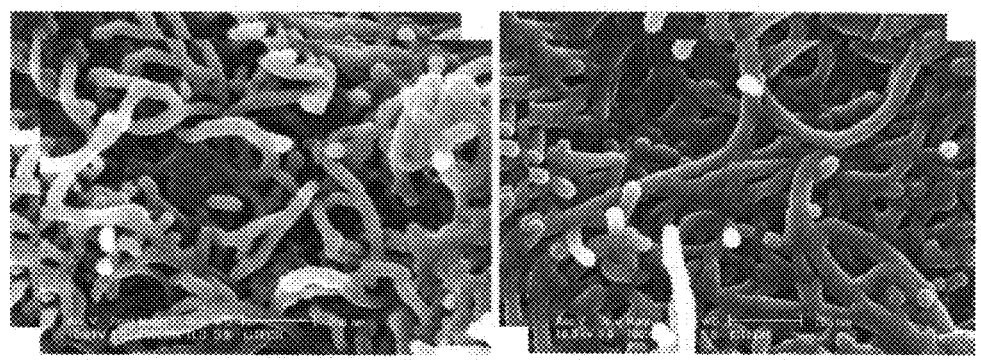

FIG. 3 shows scanning electron microscopy (SEM) images (magnification 1,000,00×) of surface shapes of the urea/carbon nanotube composites formed using the urea solutions at concentrations of (a) 1M, (b) 2M, (c) 6M and (d) 8M. The images of FIG. 3 show that the thickness of the urea layers coated on the surface of the composites increased as the concentration of the urea solutions increased. The weight proportions of the urea layers formed in the urea solutions at different concentrations were quantitatively analyzed, and the results are shown in Table 1.

TABLE 1

| Urea solution (M) | 1 | 2 | 6 | 8 |
|---|---|---|---|---|
| wt % | 20.3 | 32.5 | 64.8 | 75.7 |

As can be seen from the results in Table 1, the amounts of the urea formed on the carbon nanotubes increased linearly with increasing concentration of the urea solutions.

Example 1-(3)

Synthesis of Nickel Hydroxide/carbon Nanotube Composites

Distilled water and propanol were mixed together in a volume ratio of 5:95 and stirred for about one hour to prepare a mixed solvent. Subsequently, nickel nitrate was added to the mixed solvent until the final concentration reached 0.1 M and stirred for 24 hours to prepare a solution of the nickel nitrate. 0.1 g of each of the urea/carbon nanotube composite samples was added to 50 mL of the solution. Then, the resulting solution was placed in a closed state and allowed to react by microwave heating at a temperature of 130° C. for about 10 minutes to synthesize nickel hydroxide/carbon nanotube composites.

The nickel hydroxide/carbon nanotube composites were separated by filtration, washed several times with distilled water to remove residual anions and nickel ions, and dried at 100° C. for about 24 hours.

Experimental Example 1

Analysis of Urea/carbon Nanotube Composites

The urea/carbon nanotube composites formed in Example 1-(2) were analyzed by x-ray diffraction (XRD) and high resolution transmission electron microscopy (HR-TEM). The analytical results are shown in FIGS. 4 and 5.

Figure 4:
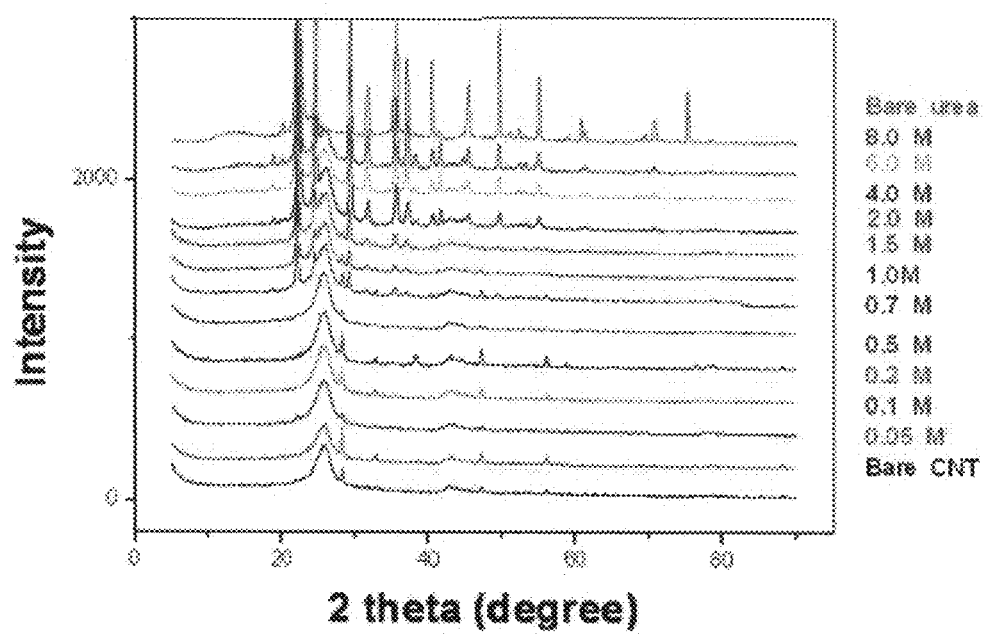
FIG. 4 shows x-ray diffraction (XRD) patterns of urea coated on urea/carbon nanotube composites formed in Example 1-(2), bare urea, and bare carbon nanotubes.

Specifically, FIG. 4 shows x-ray diffraction (XRD) patterns of the urea coated on the urea/carbon nanotube composites formed in the urea solutions at different concentrations, bare urea, and bare carbon nanotubes. Referring to FIG. 4, diffraction peaks characteristic to the bare carbon nanotubes and the bare urea are observed even in the urea-coated carbon nanotube composites, indicating that the urea was coated on the carbon nanotubes by physical adsorption while maintaining its inherent characteristics rather than by chemical bonding. These results demonstrate that water necessary for the hydrolysis of the urea was present on the carbon nanotubes.

Figure 5:
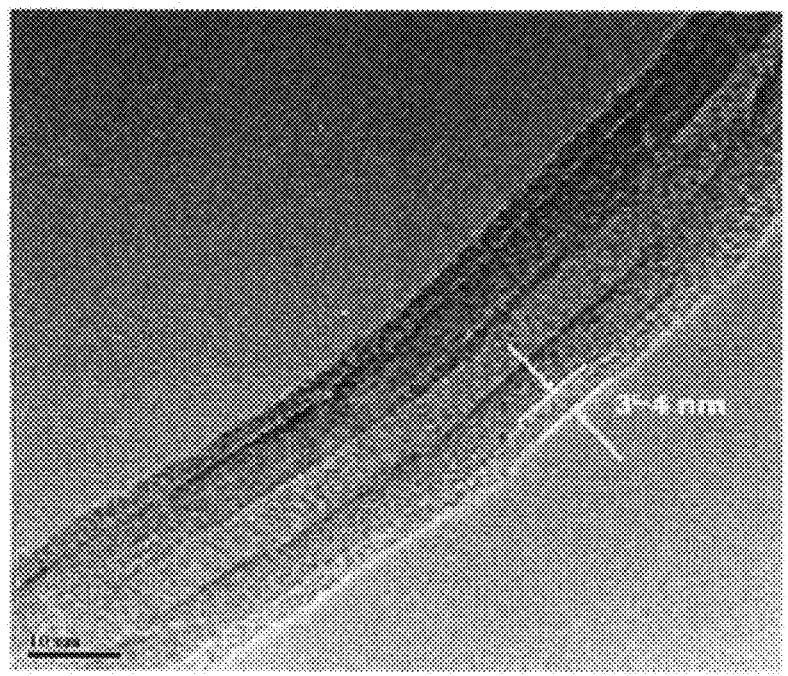
FIG. 5 is a high-resolution transmission electron microscopy (HR-TEM) image of 30 urea/carbon nanotube composites formed in Example 1-(2)

FIG. 5 is a high-resolution transmission electron microscopy (HR-TEM) image of the urea/carbon nanotube composites containing 64.8 wt % of urea, which were formed in the 6M urea solution.

The image of FIG. 5 shows that a urea layer having a thickness of about 3 to about 4 nm and a uniform shape was formed on the carbon nanotubes.

Experimental Example 2

Analysis of Nickel Hydroxide/carbon Nanotube Composites

The nickel hydroxide/carbon nanotube composites synthesized in Example 1-(3) were observed under a scanning electron microscope (SEM). The results are shown in FIG. 6.

Figure 6:
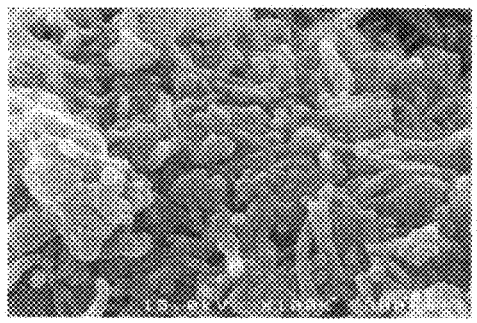
Figure 6:
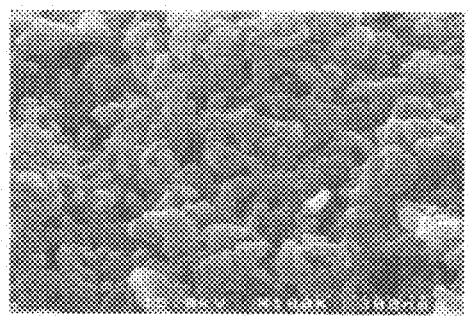
Figure 6:
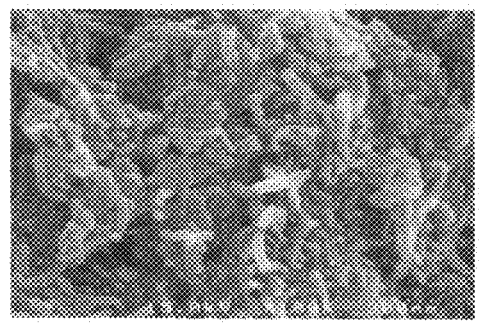
Figure 6:
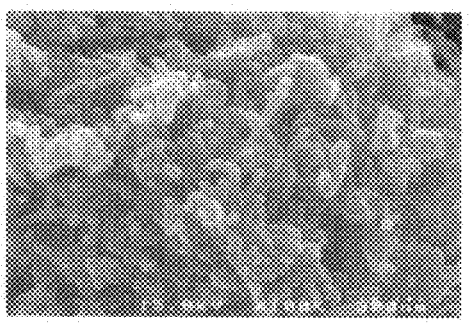

Specifically, FIG. 6 shows SEM images of the nickel hydroxide/carbon nanotube composites synthesized using the urea/carbon nanotube composites containing (a) 29.5%, (b) 53.7%, (c) 64.8% and (d) 73.2% by weight of urea.

The images of FIG. 6 show that the nickel hydroxide/carbon nanotube composites became thicker as the urea content of the precursors increased.

Figure 7:
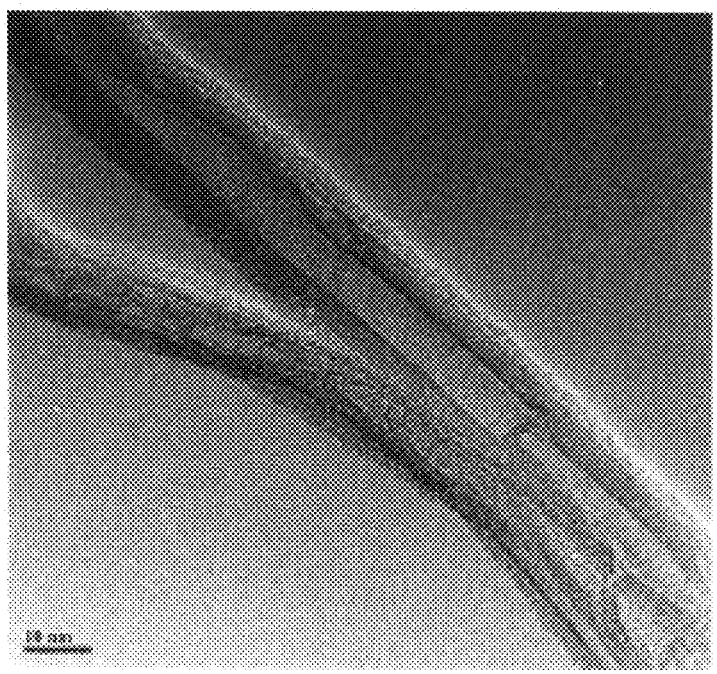
FIG. 7 is a TEM image of nickel hydroxide/carbon nanotube composites synthesized in Example 1-(3).

FIG. 7 is a TEM image of the nickel hydroxide/carbon nanotube composites synthesized using the urea/carbon nanotube composites containing 53.4 wt % of urea.

The image of FIG. 7 shows that the nickel hydroxide layer of the nickel hydroxide/carbon nanotube composites had a thickness between about 2 and about 3 nm.

As apparent from the above description, the method of the present invention enables the synthesis of nanocomposites in which a metal oxide or hydroxide coating is formed to a constant thickness on carbon nanotubes. In addition, the method of the present invention has an advantage in that the thickness of the coating can be readily regulated by controlling the content of urea to be hydrolyzed. Furthermore, the nanocomposites of the present invention are nanometer-sized particles in the form of powders, have a high electrical conductivity and a large specific surface area, and allow surface oxidation/reduction reactions to continuously occur in the available potential range. Therefore, the nanocomposites of the present invention are useful as electrode active materials for lithium secondary batteries, electrochemical capacitors (supercapacitors), such as electrochemical double layer capacitors and pseudo capacitors, polymer batteries, and the like.

What is claimed is:

1. A method for the synthesis of nanocomposites, the method comprising the steps of
    mixing carbon nanotubes with a urea solution, the urea solution comprising a solvent selected from water and ammonia water, to form urea/carbon nanotube composites;
    separating the urea/carbon nanotube composites;
    mixing the separated urea/carbon nanotube composites with a solution of a metal oxide or hydroxide precursor to prepare a precursor solution, wherein the solution of the metal oxide or hydroxide precursor comprises water and an alcohol-based organic solvent; and
    hydrolyzing the urea in the precursor solution to form a metal oxide or hydroxide coating on the carbon nanotubes.

2. The method according to claim 1, wherein hydrophilic functional groups are introduced on the carbon nanotubes before mixing in the first step.

3. The method according to claim 2, wherein the hydrophilic functional groups are selected from the group consisting of carboxyl, hydroxyl and amino groups.

4. The method according to claim 2, wherein the hydrophilic functional groups are introduced by dipping the carbon nanotubes in an acidic solution containing at least one acid selected from the group consisting of sulfuric acid, nitric acid and hydrochloric acid.

5. The method according to claim 1, wherein the content of the urea in the urea/carbon nanotube composites is between 20 and 75 parts by weight.

6. The method according to claim 1, wherein the metal oxide or hydroxide precursor includes at least one metal salt selected from the group consisting of Ni, Cu, Cr, Co, Zn and Fe salts.

7. The method according to claim 1, wherein the metal oxide or hydroxide precursor includes nickel nitrate.

8. The method according to claim 1, wherein the alcohol-based organic solvent is propanol.

9. The method according to claim 1, wherein the water and the alcohol-based organic solvent are used in a volume ratio of 4:96 to 10:90.

10. The method according to claim 1, wherein the hydrolyzing the urea comprises microwave heating.

11. The method according to claim 1, wherein the hydrolyzing the urea is conducted at 110 to 150° C. for 8 to 12 minutes.

12. The method according to claim 1, wherein during hydrolyzing the urea, the pH is adjusted to 8 to 10.

13. The method according to claim 1, wherein the nanocomposites are in the form of powders.

* * * * *